United States Patent [19]
Smith

[11] 3,750,859
[45] Aug. 7, 1973

[54] HELICAL PATH CONVEYOR
[75] Inventor: Rulo Wayne Smith, Auburn, Ind.
[73] Assignee: Rieke Corporation, Auburn, Ind.
[22] Filed: Oct. 26, 1971
[21] Appl. No.: 192,174

Related U.S. Application Data
[63] Continuation-in-part of Ser. No. 85,150, Oct. 29, 1970, abandoned.

[52] U.S. Cl. .............................. 198/136, 198/203
[51] Int. Cl. ...................... B65g 15/28, B65g 23/04
[58] Field of Search ............................ 198/136, 203

[56] References Cited
UNITED STATES PATENTS
3,348,659  10/1967  Roinestad ..................... 198/203 X Primary Examiner—Edward A. Sroka
Attorney—Harold R. Woodard et al.

[57] ABSTRACT

Disclosed is a power driven booster assembly and a power driven conveyor belt tensioner assembly which assist in driving with minimum wear, a travelling conveyor belt which moves in a path formed by helically wrapping the conveyor belt on a series of rotating drums or cages.

4 Claims, 9 Drawing Figures

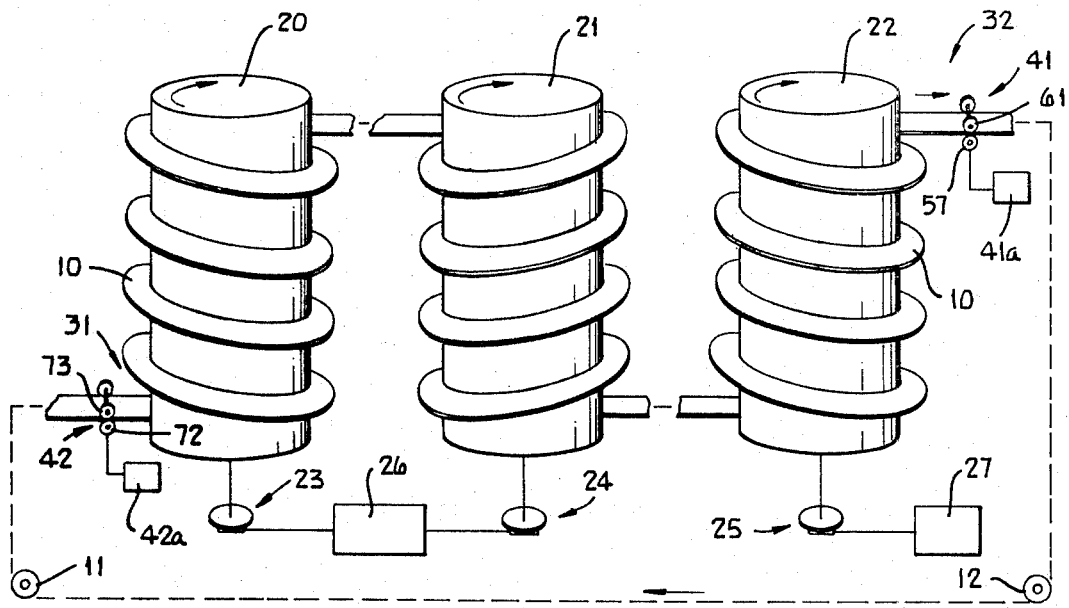
Fig. 1.
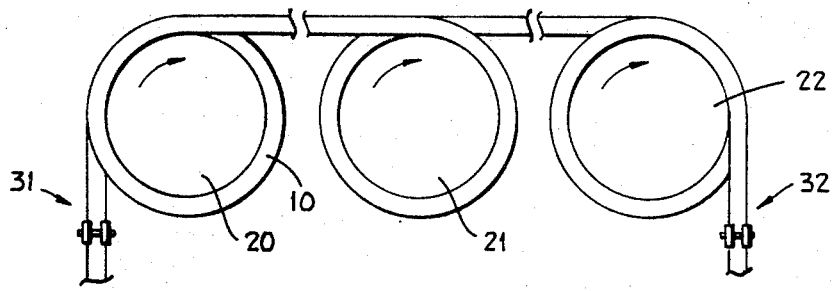
Fig. 2.
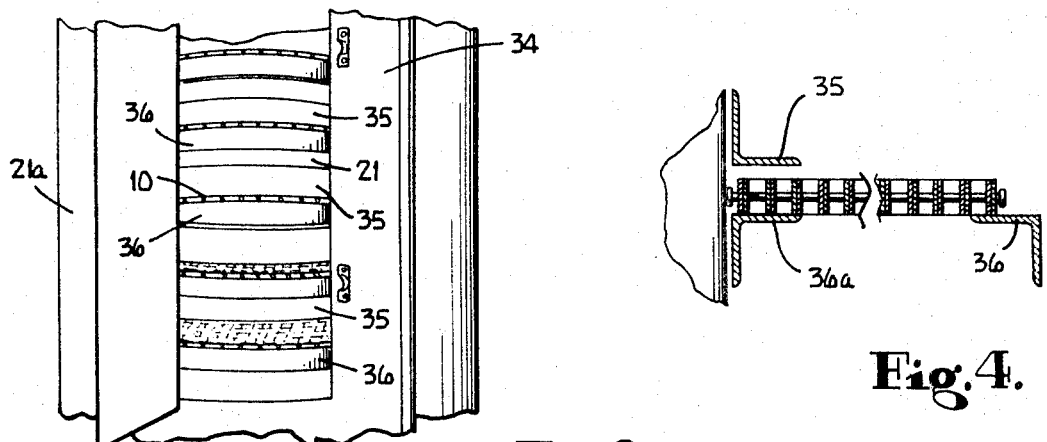
Fig. 3.
Fig. 4.

HELICAL PATH CONVEYOR

This application is a continuation-in-part of my application Ser. No. 85,150 filed Oct. 29, 1970, titled "Helical Path Conveyor," now abandoned.

BACKGROUND OF THE INVENTION

In processing of industrial materials and food products, the continuous movement of the material into and out of processing areas, such as heat treating or baking ovens, can best be performed by travelling belt type conveyor systems. The material must be moved through a series of treatment zones, such as preheat, bake and cooling areas, with various dwell or retention time in each area. One of the best systems for producing the required results utilizes a conveyor system in which an endless conveyor belt, formed of pivotally joined metal links, is helically wrapped in series over a plurality of axially parallel, uniformly rotating drums, the excursion of the belt in its helical path over each of the drums providing the required dwell time for the product in the particular processing area. Such a system is continuous, requires no transfers of the product from one conveyor belt to another and requires a minimum of floor space.

The belt may be of the type known in the prior art and disclosed in Bechtel U.S. Pat. No. 2,872,023. Because of the multiple spiral path of the belt and the inter-action of the inner edge of the belt with the rotating drum surfaces, smooth, low-tension operation of the belt through its path is difficult to achieve in these installations. Buckling and lifting of the edge of the belt and surges in the belt speed are problems regularly encountered in their operation.

The present invention provides a first motive power supplying assembly providing an auxiliary imput to the belt, adjacent the loading area for the belt, the belt motive power added to the belt by this booster assembly being sufficient to propel the belt into engagement with the initial drum under only relatively small tension, a tension just sufficient to hold the inner margin of the belt against the drum surface thereby permitting the belt to be frictionally driven by the rotating drum. Further, a second motive power supplying assembly is provided which acts on the belt adjacent the belt unloading area, the function of this pacer-tensioner for the belt is to supply enough torque to the belt to lock the inner edge of the belt in non-slip relation to the surface of the final drum traversed by the belt. The joint action of these two supplemental power supplying assemblies produces the smooth, non-buckling motion of the belt required for proper operation of this type of conveyor system.

BRIEF DESCRIPTION OF THE DRAWING

FIG. 1 is a schematic view of a conveyor system embodying the present invention.

FIG. 2 is a top plan, schematic view of the structure shown in FIG. 1.

FIG. 3 is a side view of one of the drums and a portion of the conveyor shown schematically in FIG. 1.

FIG. 4 is a fragmentary, sectional view illustrating the support for the conveyor belt.

DESCRIPTION OF THE PREFERRED EMBODIMENT

Figure 5:
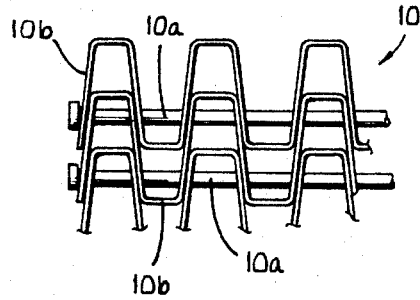
FIG. 5 is a fragmentary, top view of a portion of the conveyor belt.

Referring initially to FIG. 1, there is shown schematically an endless belt 10 which may be formed of pivotally joined metal links. Belt 10 is shown in detail in FIG. 5 and is composed of a series of cross pins 10a joined by transverse links 10b. The belt structure permits curvature in the plane of the belt. Its specific construction forms no part of the present invention and the belt structure is disclosed in detail in the aforementioned U.S. Pat. No. 2,872,023. The belt moves over rollers or sprockets shown schematically in FIG. 1 at 11 and 12.

Disposed between the sprockets 11 and 12 are cylindrical drums 20, 21 and 22, mounted for rotation on vertical axes. The initial drum 20 and intermediate drum 21 are driven uniformly, in the direction indicated, by any suitable means such as the worm and gear arrangement shown schematically at 23 and 24. The drive means for the gears 23 and 24 is indicated schematically at 26 and can take the form of any suitable element such as an electric motor. The final drum 22, driven to provide a slightly slower surface speed than the other two, obtains its drive from motor 27, having a worm and gear connection 25 to drum 22. While three rotating drums are shown, it will be understood that any practical number of drums might be utilized, each carrying any practical number of belt flights, the drums forming the means of producing the dwell in the belt movement which is necessary to hold the product carried by the belt in a processing stage. As illustrated in FIG. 1, the drums 20 and 21 might be enclosed forming baking and tempering ovens. Similarly, the drum 22 might be enclosed in a cooling oven. As will be evident from FIGS. 1 and 2, the belt 10 enters the oven area at the location generally indicated at 31, is helically wound in ascending spirals on the drum 20, passes between the drums 20 and 21 and is helically wound in descending spirals on the drum 21. The belt leaves the drum 21 and is helically wound in ascending spirals on the drum 22. The belt leaves drum 22, and the cooling oven enclosing it, at the location generally indicated at 32.

The drum 21, shown schematically in FIGS. 1 and 2, is shown also in FIG. 3. A sliding access door 34, forming a part of the oven 21a, enclosing drum 21, is also illustrated. The outer, stationary spiral support rails for the belt are indicated at 36, and, as will be apparent from FIG. 4, inner support rails 36a are also provided for the belt. Where needed, particularly in the downwardly travelling spiral of the belt, overlying restraint rail 35 (FIG. 4) is also provided. These rails 35, 36 and 36a are, of course, mounted stationary within the enclosure, being supported, by means not shown, by the structural portions of the enclosure.

The apparatus so far described is generally conventional with the powered rotation of the drums serving to move the endless belt over the surface of drums 20, 21 and 22. The difficulties previously referred to are, however, commonly encountered with such installations. The apparatus of the present invention, which produces a smooth, low tension movement of the belt around its extended paths will now be described.

Figure 6:
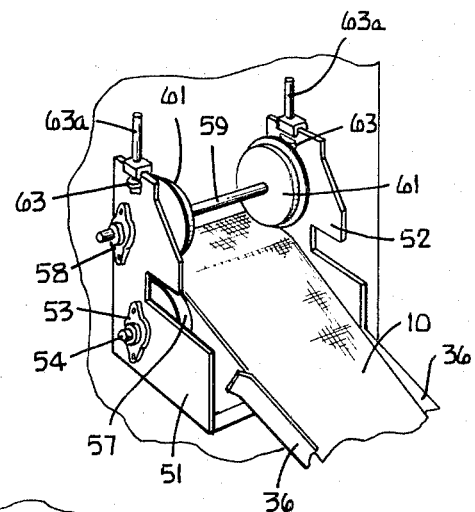
FIG. 6 is a perspective view of a portion of the apparatus shown in FIG. 1.
Figure 7:
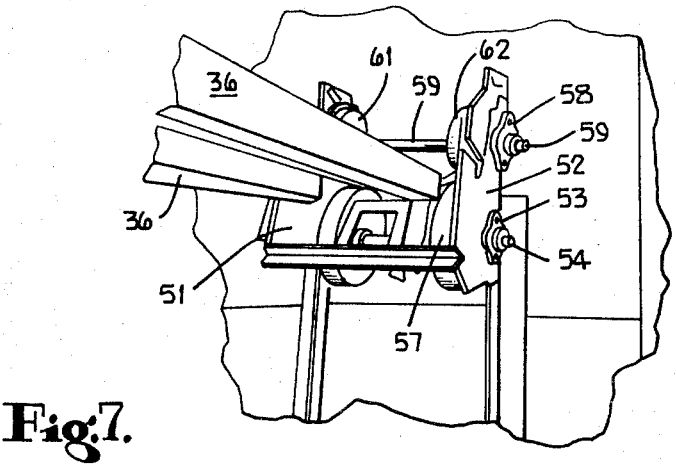
FIG. 7 is further perspective of the apparatus shown in FIG. 6.

The pacer-tensioner, illustrated generally at 41 in FIG. 1, and shown more specifically in FIGS. 6 and 7, together with the booster assembly, indicated generally at 42 in FIG. 1, provide the desired tension on, and movement of, the belt. These two units are generally identical, motive power supplying assemblies. As may best be seen in FIGS. 6 and 7, the assembly 41 includes two support plates 51 and 52 which extend upwardly adjacent each side margin of the belt 10. Bearings 53 supported on the plates permit rotation of a shaft 54 which extends beneath the belt 10 and its supporting rails 36. Shaft 54 is rotated by the constant torque power source 41a, schematically shown in FIG. 1, which may take the form of a conventional air motor. Rotated by the shaft 54 are lower wheels 57 which engage the opposite side marginal areas on the underface of the belt 10.

Figure 8:
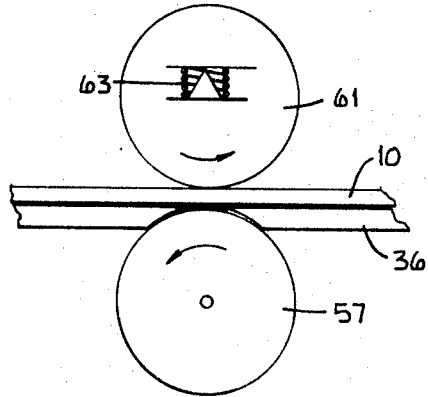
FIG. 8 is a side view schematically illustrating the apparatus shown in FIGS. 6 and 7.

Suitable bearings 58, mounted on the plates 51 and 52, support for free rotation the shaft 59 which spans the belt 10 above its upper face. The shaft 59 carries upper wheels 61 which are flanges and engage the side marginal areas of the upper face of the belt. Resilient means, such as compression springs 63 bias the floating bearings 58 downwardly so that the wheels 61 press the marginal areas of the belt against the underlying lower wheels 57. Adjustment members 63a may be utilized to adjust the force with which the upper wheels are biased downwardly against the belt. The adjustment of these members is such that there is a non-slip engagement of the lower, driving wheels with the belt. The lower wheels 57 are driven by the air motor 41a, as indicated schematically in FIG. 1, and the torque delivered by constant torque power source 41a is selected so that the belt tension at area 32 (FIG. 1) is sufficient to lock the inner edge of the belt against the surface of drum 22 so that the belt is driven without slippage by drum 22. The final drum in the series, drum 22 is thus made the pacer for the system and its surface velocity is maintained by motor 27 at a value approximately 2 to 3 per cent less than the surface velocity of drums 20 and 21. The relation of the upper and lower wheels with the belt and the spring loading of the upper wheels 61 so that the belt is pressed into non-slip engagement with the lower wheels 57 is shown in enlarged, schematic form in FIG. 8. The pacer tensioner assembly 32 tensions the belt so that it does not slip with relation to the pacer drum 22 and thus minimizes the system power requirement and system wear.

The booster assembly 42 (FIG. 1) is identical to the pacer assembly in constructon and consists of lower wheels 72 and upper wheels 73 which press the marginal areas of the belt against the underlying wheels 72. The power means for driving the booster assembly is indicated at 42a in FIG. 1 and, like the drive means 41a, is of the constant torque type, such as an air motor, and the lower, drive wheels 72 of the booster assembly are driven by the power means 42a. The output of the onstant torque power source 42a is established such that the belt tension at area 31 is very low, thereby minimizing the load on the initial drum 20 and minimizing, therefore, the power requirement of this drum and its wear rate. The booster assembly 42 provides almost all the force necessary to propel the belt from area 32 to area 31, only a very low tension remaining on the belt at area 31 to just hold the inner edge of the belt against the surface of drum 20.

Figure 9:
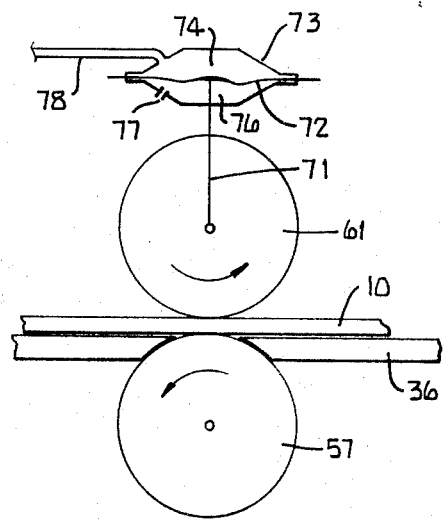
FIG. 9 is a side view, similar to FIG. 8, but schematically illustrating a modified form of the apparatus shown in FIG. 8.

FIG. 9 illustrates a modified form for the means for adjustably urging the upper wheels of the booster assembly, and of the pacer-tensioner assembly, against the lower wheels. In the structure of FIGS. 6 an 8, this means takes the form of adjustable compression springs 63. In FIG. 9 such means takes the form of thrust rod 71, moved by flexible diaphragm 72. The diaphragm is mounted within housing 73 and forms a moveable wall between a pressure chamber 74 and a chamber 76, vented to atmosphere at 77. The chamber 74 is pressurized by means of conduit 78 which is supplied with air, or other fluid, under pressure from a source of pressurized fluid (not shown). The source of pressurized air may be the same source that supplies air motors 41a and 42a. The effective working area of diaphragm 72 is sized so that the downward force exerted on wheels 61 multiplied by the coefficient of friction between lower wheels 57 and the marginal area of belt 10 exceeds the tractive force developed at the line of contact between wheels 57 and the belt. The small excess in frictional force serves to assure that there will be no malfunction of the drive should a change occur in the value of the coefficient of friction at the area of engagement of lower wheels 57 and the marginal area of the belt. This means of applying force to the belt-lower wheel junction minimizes wear on the rim area of wheels 57 and 61 and on the marginal areas of belt 10. It tends to prevent damage to the wheels 57 and 61 and belt 10 which can be caused by excessive tightening of spring 63 in the spring-biased structure of FIGS. 6 and 8.

In operation, referring to FIG. 1, articles to be carried by the belt through the conditioning environments adjacent each of the drums may be loaded on the belt 10 in the area indicated at 31. The conditioned articles may be unloaded, or removed, from the belt in the area indicated at 32. It will be understood, however, that loading and unloading of the belt can be carried out anywhere convenient along the path of the belt shown in broken lines in FIG. 1, that is, between areas 31 and 32. The primary belt drive results from the frictional drive provided by drums 20 and 21 on the belt edge and the non-slip drive imparted to the belt by the final drum 22 which rotates at a surface velocity 2 to 3 per cent less than that of the preceding drums.

While a system utilizing three drums has been illustrated, any differing, practical number of drums could be utilized. The pacer-tensioner assembly 41 provides sufficient tension to the belt to lock the inner edge of the belt in non-slip engagement with the surface of the pacer drum 20. The booster assembly 42 (identical in structure to assembly 41) reduces the tension in the belt, at area 31, to that just sufficient to hold the belt edge in sliding engagement with the surface of the initial drum 20.

I claim:

1. In a conveyor system of the type in which an endless conveyor belt formed of pivotally joined links is helically wrapped in series over a plurality of axially parallel uniformly rotating drums with the plane of the belt generally transverse to the axis of rotation of the drums, the improvement comprising: power means for rotatng said drums about their central axis with the last drum in the series having a surface speed of the order of two per cent less than that of the preceding drums in the series, a first motive power supplying assembly for said belt including a rotatable member having non-slip engagement with the conveyor belt adjacent to and upstream of the initial engagement of the belt with the first of said drums and a constant torque power source adapted to drive said rotatable member, a second motive power supplying assembly for the belt including a rotatable member having non-slip engagement with said conveyor belt adjacent to but downstream of the area of final engagement of the belt with the last drum of said series and a constant torque power source adapted to drive said last mentioned rotatable member, said first and second motive power supplying assemblies each taking the form of two pairs of coaxially mounted wheels, one pair of wheels being mounted for rotation overlying said belt with the wheels engaging the opposite side marginal areas on one face of the belt and the other pair of wheels mounted for rotation underlying said belt with said last mentioned wheels engaging the opposite side marginal areas on the other face of the belt, said last mentioned wheels being power driven, the output of said first motive power supplying assembly to said belt being such as to establish the belt tension as it engages the first of said drums at a relatively low value just sufficient to hold the inner edge of the belt against the drum surface, the output of said second motive power supplying assembly to said belt being such as to lock the inner edge of the belt against the surface of said last drum in the series so that said belt is driven without slippage by said last drum, whereby said belt enters said drum series at relatively low tension, has a sliding frictional drive relation with all but the last drum in said series and has a non-slip drive relation with the last drum.

2. The improved conveyor system apparatus as claimed in claim 1 in which said one pair of wheels are adjustably spring loaded against the belt to insure positive traction engagement of the belt with the underlying power driven pair of wheels.

3. The improved conveyor system apparatus as claimed in claim 1 in which a fluid pressure operated member urges said one pair of wheels against the belt to insure positive traction engagement of the belt with the underlying power driven pair of wheels.

4. The improved conveyor system apparatus as claimed in claim 1 wherein adjustable resilient means are provided for urging said belt into positive traction engagement with said drive wheels.

* * * * *